(12) United States Patent
Westberg (10) Patent No.: US 7,740,232 B2
(45) Date of Patent: Jun. 22, 2010

(54) WINCH BAR WITH OFFSET HANDLE

(75) Inventor: Steven A. Westberg, Vancouver, WA (US)

(73) Assignee: The Westberg Group, LLC, Vancouver, WA (US)

(*) Notice: Subject to any disclaimer, the term of this patent is extended or adjusted under 35 U.S.C. 154(b) by 0 days.

(21) Appl. No.: 12/321,654

(22) Filed: Jan. 22, 2009

(65) Prior Publication Data

US 2009/0206307 A1 Aug. 20, 2009

Related U.S. Application Data

(63) Continuation-in-part of application No. 12/070,296, filed on Feb. 14, 2008.

(51) Int. Cl.
*B25B 25/00* (2006.01)
(52) U.S. Cl. ............ 254/237; 74/544; 74/545; D8/59; D8/107; 16/422; 16/436
(58) Field of Classification Search ............ 254/243, 254/237; 410/100, 103; 74/544, 545; 16/422, 16/436
See application file for complete search history.

(56) References Cited

U.S. PATENT DOCUMENTS

| | | | |
|---|---|---|---|
| 2,838,281 A | 6/1958 | Flippin | |
| 4,873,742 A * | 10/1989 | Dillon | 16/421 |
| D345,288 S | 3/1994 | Hubal et al. | |
| 5,425,154 A * | 6/1995 | Edwards, Jr. | 16/436 |
| 5,433,565 A | 7/1995 | Chan | |
| 5,636,829 A | 6/1997 | Whiteman | |
| 5,833,217 A * | 11/1998 | Goldsby | 254/266 |
| D423,332 S | 4/2000 | Salter | |
| D424,901 S | 5/2000 | Landry | |
| 6,056,488 A | 5/2000 | Depoy | |
| 6,092,437 A * | 7/2000 | Sumner | 74/544 |
| 6,102,637 A * | 8/2000 | Mocci | 410/103 |
| 6,196,092 B1 * | 3/2001 | Potter | 81/488 |
| 6,308,596 B1 * | 10/2001 | Williams | 81/177.2 |
| 6,398,470 B1 | 6/2002 | Mosley | |
| 6,659,697 B1 * | 12/2003 | Guenther | 410/103 |
| 6,824,339 B1 * | 11/2004 | Childers | 410/103 |
| 6,848,872 B2 | 2/2005 | Perkins, Jr. | |
| 6,854,939 B2 * | 2/2005 | Im | 410/100 |
| 6,916,143 B2 | 7/2005 | Guenther | |
| 7,017,847 B2 | 3/2006 | Treat | |
| D526,173 S | 8/2006 | Hudson | |
| 7,114,897 B1 | 10/2006 | Boydstun, IV et al. | |
| 7,329,075 B2 * | 2/2008 | Boydstun et al. | 410/100 |
| 7,389,971 B2 * | 6/2008 | Gaudreault et al. | 254/243 |
| 7,464,916 B1 * | 12/2008 | Drinkhorn | 254/243 |
| 2002/0074443 A1 | 6/2002 | Murdock et al. | |
| 2006/0091368 A1 | 5/2006 | Im | |
| 2006/0275095 A1 | 12/2006 | Boydstun et al. | |
| 2006/0275096 A1 | 12/2006 | Boydstun et al. | |
| 2007/0215848 A1 | 9/2007 | Gaudreault et al. | |

* cited by examiner

*Primary Examiner*—Emmanuel M Marcelo
(74) *Attorney, Agent, or Firm*—Chernoff, Vilhauer, McClung & Stenzel, LLP (57) ABSTRACT

A winch bar for use together with a strap winch to tighten a load-securing strap for a flatbed truck or trailer. In addition to an offset angle, the winch bar also includes one or more compensating angles establishing an obstacle clearance area defined by a laterally offset portion of the winch bar.

28 Claims, 8 Drawing Sheets

WINCH BAR WITH OFFSET HANDLE

CROSS-REFERENCE TO RELATED APPLICATIONS

This is a continuation-in-part of U.S. patent application Ser. No. 12/070,296, filed Feb. 14, 2008.

BACKGROUND OF THE INVENTION

The present invention relates to winch bars. More particularly, the present invention relates to winch bars for strap winches such as are used on flatbed trailers.

Flatbed trailers of various lengths, widths, and load capacities are used to transport materials of various types from one location to another, both on and off roadways.

Loads are usually secured to such flatbed trailers by one or more straps of woven webbing extending over a load from one side of the trailer to the other side. Each strap is tightened by being wound on a strap winch such as the strap winch 18 shown in FIGS. 1-3, mounted at one side of the trailer. Such a strap winch usually includes a ratchet mechanism including a ratchet wheel 20 and a related pawl 22 on a spool 24, and a spool drive hub, or winch bar receiver 26, so that a winch bar can be used as a lever to turn the winch spool 24 and tighten the strap. The spool drive hub, or winch bar receiver 26 usually has two intersecting through-bores orthogonal to each other and to the axis of rotation 28 of the winch spool 24. The through-bores thus define four winch bar sockets 30 separated from one another by a quarter revolution of the winch bar receiver 26.

Figure 1:
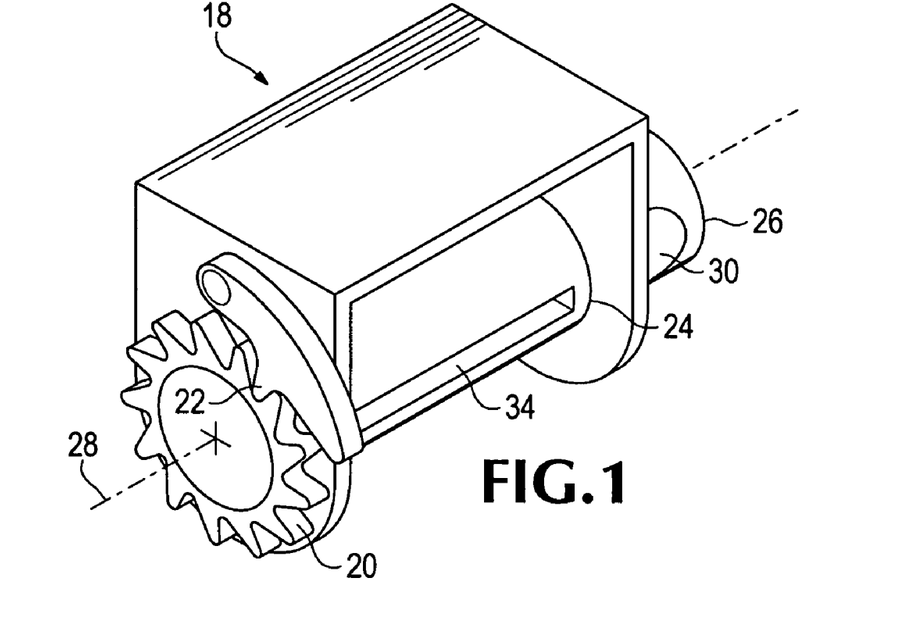
FIG. 1 is an isometric view of a strap winch mounted on a flatbed trailer and showing the ratchet wheel and pawl at a left end of the strap winch.
Figure 2:
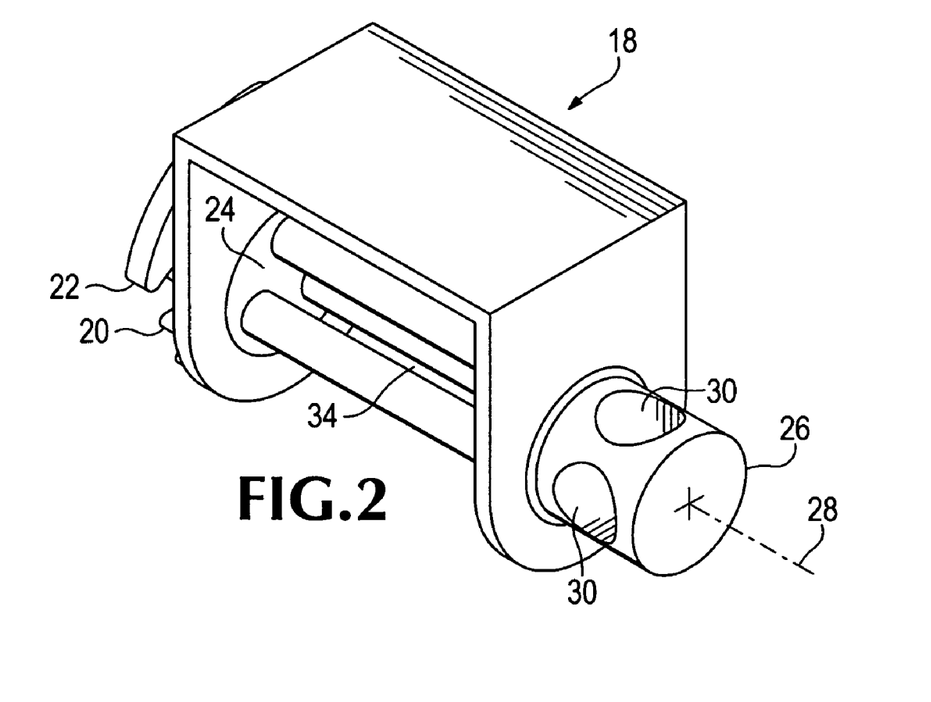
FIG. 2 is an isometric view of the strap winch shown in FIG. 1, showing the right end of the winch and a drive hub including winch bar sockets.
Figures 3, 4:
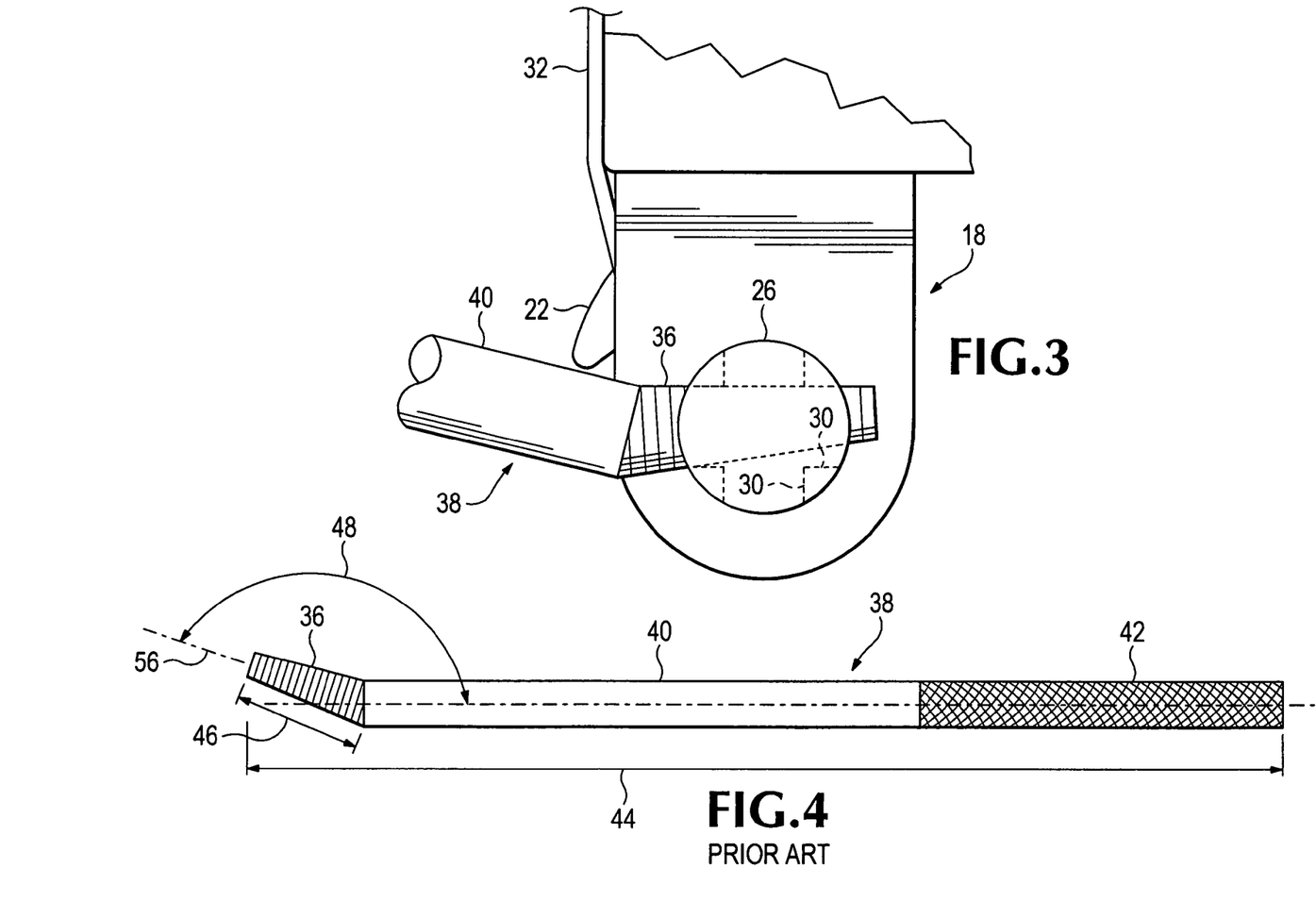
FIG. 3 is an end view of the strap winch shown in FIGS. 1 and 2, showing a portion of a winch bar engaged drivingly with a socket defined by the spool drive hub.
FIG. 4 is a side elevational view of a prior art winch bar.

A strap 32 fastened to one side of the trailer is thrown over a load item on the trailer and the other end is laced through strap slots 34 on the winch spool 24. Such strap slots 34 and spools 24 may be of different types, such as those shown in FIGS. 1 and 2, but are functionally similar. A spool drive engagement portion 36 of the winch bar is inserted into one of the winch bar sockets 30 in the winch drive hub, or receiver 26, and moved in a downward direction as seen in FIG. 3, winding the strap 32 around the spool 24 and tightening the strap 32 to hold the load item on the trailer. The winch bar sockets 30 are typically fashioned so that the spool drive engagement portion 36 of the winch bar, when inserted into one of these sockets, is perpendicular to the axis of rotation 28 of the winch spool. The spool ratchet mechanism, as shown in FIG. 1, holds the spool 34 to retain the tightened strap 32 after the winch bar has been moved in a downward direction.

A typical conventional winch bar 38, shown in FIG. 4, for use with a such a strap winch 18 may have a winch spool drive engagement portion 36, a lever arm portion 40, and a grip or handle portion 42. It may be a steel bar approximately 31-40 inches in length 44. The winch spool drive engagement portion 36 may be tapered and may typically have a length 46 of approximately 3½ to 4 inches, to mate with a typical strap winch 18. The drive engagement portion 36 is typically mounted at an offset angle 48 in the range of approximately 140 degrees to 170 degrees relative to a central longitudinal axis 50 of the lever arm portion 40.

On a typical winch bar 38 the offset angle 48 is defined adjacent the spool drive engagement portion 36, between it and the lever arm portion 40 of the winch bar. The offset angle 48 allows such a winch bar 38 to be used in two basic positions: angled up and angled down. This allows the winch bar to clear obstacles such as tires, trailer fenders, and boxes mounted on the sides of a trailer.

In order for a load securing strap 32 to be tightened on the strap winch 18, the spool 26 must be able to be turned at least a quarter rotation and then held by the ratchet mechanism, so that the winch bar can be inserted into the next socket 30 for further tightening. Often, due to obstacles such as tires, etc., mentioned above, the winch bar 38 cannot rotate the winch spool a quarter revolution without being changed from the angled down portion to the angled up position, or vice versa, in the same socket 30.

Figure 5:
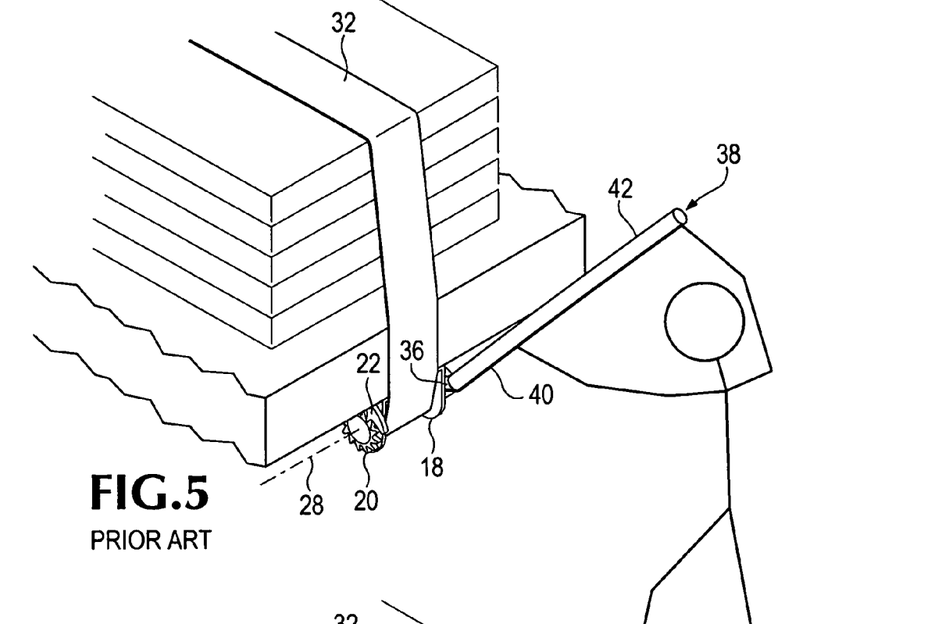
FIG. 5 is a view of a winch bar such as that shown in FIG. 4 at the top of a strap-winding stroke of the winch bar used to tighten a load securing strap on a strap winch such as the one shown in FIGS. 1-3.

Use of a conventional winch bar 38 presents several hazards. The most important hazard is presented by use of the winch bar 38 in the "angled up" position as the winch bar 38 is shown in FIG. 5. If there is any misalignment of downward force on the winch bar handle 42, to one side or the other, the drive engagement portion 36 of the bar may slip in the winch bar socket 30 and twist down, in a pivoting action, and an uncontrolled conical rotation of the winch bar handle portion 42 thus suddenly occurs, as indicated by the arrow in FIG. 6. This often causes the winch bar user to fall towards the ground, potentially hitting his or her upper body or face against the trailer, the winch bar, a fender of the trailer, or even the ground. The user could thus sustain serious physical injury.

The next most important risk with use of conventional winch bars 38 is that the tip of the spool drive engagement portion 36 may slip out radially from engagement in the socket 30 of the spool drive hub 26. Although typically a winch bar 38 has small ridges around its drive engagement portion 36, sometimes they are not adequate to keep the winch bar 38 engaged in a winch bar socket 30. As a result the winch bar 38 can slip out when the user's pull on the winch bar to turn the winch spool 24 includes a great enough component directed radially outward along the spool drive engagement portion 36. Such slipping out may cause the winch bar user to fall towards the ground, potentially striking various portions of himself or herself against the winch bar, trailer, etc., with a possibility of substantial injury.

Another considerable risk in use of a conventional winch bar 38 is the downward slope of the handle portion 42 when the winch bar 38 is used in the most commonly used position, angled down. As the user applies downward pressure on the winch bar handle portion 42, he or she tends to be pushing his or her grip along the lever arm portion 40 and towards the outer end of the handle portion 42, instead of only perpendicular to it. This has a tendency of causing the user's grip to slip along the handle portion 42, causing the user to fall towards the winch bar, trailer, and ground, thereby often sustaining injury.

A number of prior winch bars or winch bar-like devices have not adequately addressed the above-described risks.

Gaudreault, et al., U.S. Patent Application No. 2007/0215848 discloses a leverage tool having a pair of opposite end portions, one of which can be engaged with a strap spool drive, and the other of which is adapted to engage a load binder handle to operate the load binder.

Murdock, et al., U.S. Patent Application No. 2002/0074443 discloses a strap winch and a crank assembly removably connected to the strap winch.

Boydstun, IV, et al., U.S. Pat. No. 7,114,897 discloses a winch bar providing an indication when a sufficient force has been applied.

Treat, U.S. Pat. No. 7,017,847 discloses a winding apparatus including a crank that is used to quickly and conveniently wind cargo straps into coils for storage.

Guenther, U.S. Pat. No. 6,916,143 discloses a speed handle, or crank used to rotate the strap spool of a strap winch on a flat bed trailer.

Im, U.S. Pat. No. 6,854,939 discloses a winch bar that has an insertion portion of non-circular cross-section, typically square or hexagonal, adapted to fit in similar openings of a winch spool so that the winch bar cannot twist relative to the winch drum. Im, U.S. Patent Application No. 2006/0091368 discloses a winch bar that may have an insertion portion of any of several different shapes adapted to fit in openings of a winch spool.

Perkins, Jr., U.S. Pat. No. 6,848,872 discloses a crank to drive a spool of a strap winch, to wind a strap on the spool for storage when the strap is not being used to secure a load.

Childers, U.S. Pat. No. 6,824,339 also discloses a crank handle for speed winding a strap back onto a strap winch for storage.

Guenther, U.S. Pat. No. 6,659,697 discloses a winch bar having two positions of stable engagement with a strap winding winch.

Mosley, U.S. Pat. No. 6,398,470 discloses another strap winding crank for winding a strap on a strap winch for storage.

Mocci, U.S. Pat. No. 6,102,637 discloses yet another crank for winding a strap onto a winch for storage.

Sumner, U.S. Pat. No. 6,092,437 discloses a winch bar for use with ratcheting winches to tighten straps for securing cargo on truck beds. The winch bar is provided at one end with a hooked end member and a crank handle portion to assist in the rapidly winding a strap secured to the winch spool.

Depoy, U.S. Pat. No. 6,056,488 discloses a winch bar having a locking mechanism for securing the driving end portion of a winch bar in a drive socket of a winch.

Whiteman, U.S. Pat. No. 5,636,829 discloses an extensible winch bar for use in tightening the straps used for the securing loads on trucks.

Chan, U.S. Pat. No. 5,433,565 discloses a winch bar with a winch spool-engaging end portion shaped to engage a spool of a strap winch securely and to resist unintentional disengagement under strap-winding force.

Edwards, Jr., U.S. Pat. No. 5,425,154 discloses a winch bar for use on a strap winch. A second end of the bar includes a latch for engaging and operating an over-center locking load binder.

Flippin, U.S. Pat. No. 2,838,281 shows a winch bar with an end portion shaped to mate with a corresponding socket in a winch.

Thus, there is a need for a winch bar that addresses and can reduce risks of using a conventional winch bar, including the risks mentioned above.

SUMMARY OF THE INVENTION

In response to some of the aforementioned shortcomings and disadvantages of previously known winch bars, the applicant provides, as disclosed herein and defined by the claims that are included herein, a winch bar including as one feature an offset portion, to fit around obstacles that might otherwise limit the range of movement of the winch bar as it is used to tighten a load strap on a strap winch on a flatbed trailer.

A winch bar that is one embodiment of the disclosure includes a winch drive engagement portion insertable into a socket of a winch spool drive hub, or receiver; a reach portion connected to said drive engagement portion; and a handle connected to said reach portion, wherein the drive engagement portion is connected with the reach portion at an offset angle; and the reach portion is connected with the handle at a compensating angle.

In one embodiment the handle intersects a longitudinal axis of the winch drive engagement portion.

The compensating angle can place the longitudinal axis of the handle in line with the longitudinal axis of the winch drive engagement portion in one embodiment.

As another feature, one or more compensating angles may place a portion of the handle of a winch bar parallel with the central axis of the spool drive engagement portion, reducing the tendency of the winch bar to rotate down in response to force applied to the winch bar to turn the winch spool, and providing a handle alignment that helps reduce the slope of the handle.

The foregoing and other features of the invention will be more readily understood upon consideration of the following detailed description of embodiments taken in conjunction with the accompanying drawings.

DETAILED DESCRIPTION OF EMBODIMENTS

Figure 7:
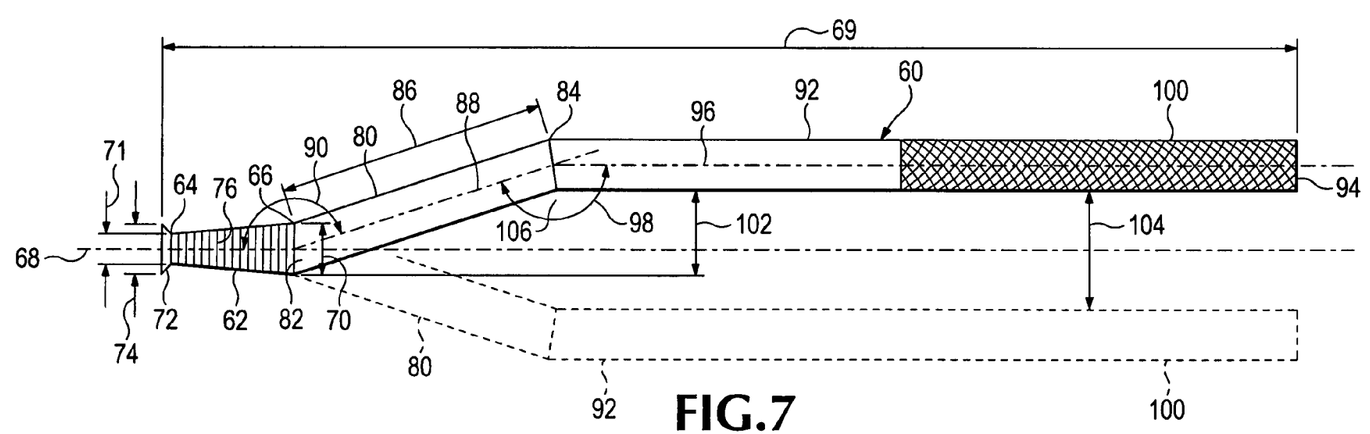
FIG. 7 is a side elevational view of a winch bar embodying a feature of the present invention and including a compensating angle whose size is related to an offset angle of the winch bar.

Referring again to the drawings which form a part of the disclosure herein, a winch bar 60 shown in FIG. 7 includes a winch drive engagement portion 62 that has a tip 64 and a root end 66 and defines a central longitudinal axis 68. The overall length 69 of the winch bar 60 may be similar to that of the previously known winch bars such as the winch bar 38 shown in FIG. 4, such as 31 to 40 inches, for example, although a length 69 in the range of 24-48 inches could also be useful, and a length 69 of 36 inches might be convenient in view of a common toolbox size. The drive engagement portion 62 may be conical, tapered from a slightly larger diameter 70 at the root end 66 toward a smaller diameter 71 near the tip 64, and may be circular in cross section as viewed along the central longitudinal axis 68. At the tip 64 a safety catch 72 extends radially to a larger diameter 74 which may be similar to or slightly smaller than the diameter 70 at the root end. The safety catch 72 may extend, as shown in FIG. 7, as a short, wide-angle, conical or flared flange at the tip 64, and will serve to engage a winch drive hub or receiver 26 of a strap winch 20 when the drive engagement portion 62 is inserted into a drive socket 30 extending diametrically across the hub 26, so that the safety catch portion 72 protrudes on the opposite side of the hub 26. Annular grooves 76 may encircle the winch drive engagement portion 62 to aid the safety catch 72 in resisting unintended removal of the drive engagement portion 62 from a socket 30 of a strap winch drive hub 26.

Attached to and extending away from the root end 66 of the drive engagement portion 62 is an elongate portion of a lever arm of the winch bar 60 referred to herein for convenience as reach portion 80. A first, or winch, end 82 of the reach portion 80 is attached to the root end 66 of the winch drive engagement portion 62, and an opposite second, or outer, end 84 is spaced apart from the first end 82 by a reach length 86 which may be in the range of about 1-10 inches, preferably in the range of 4-10 inches, and most preferably about 8 inches, as shown in FIG. 7. The reach portion 80 has a reach portion central axis 88 intersecting the central longitudinal axis 68 of the winch drive engagement portion 62 in an offset angle 90, which as shown in FIG. 7, for example, is about 160 degrees. The offset angle 90 may be somewhat larger or smaller than shown in FIG. 7, being, for example, in the range of 100-165 degrees, or more preferably in the range of about 140-165 degrees, as will be better understood presently.

An elongate third portion 92 of the winch bar 60 is connected with the outer end 84 of the reach portion and extends further away from the winch drive engagement portion 62 to an outer end 94 of the winch bar 60. The elongate third portion 92 is an extension of the lever arm and includes a longitudinal axis 96 that intersects the reach portion central axis 88 in a compensating angle 98 which is opposite in direction and of the same or nearly the same size as the offset angle 90. The central longitudinal axis 68 of the drive engagement portion 62, the reach portion central axis 88, and the longitudinal axis 96 of the elongate third portion 92 of the winch bar 60 are preferably coplanar, so that the entire winch bar 60 is essentially in a single plane. The longitudinal axis 96 is thus at least nearly parallel with the central longitudinal axis of the drive engagement portion 62. A handle portion 100 of the elongate third portion 92 may be knurled or provided with another durable surface treatment to provide a secure grip for a user of the winch bar 60.

Figure 6:
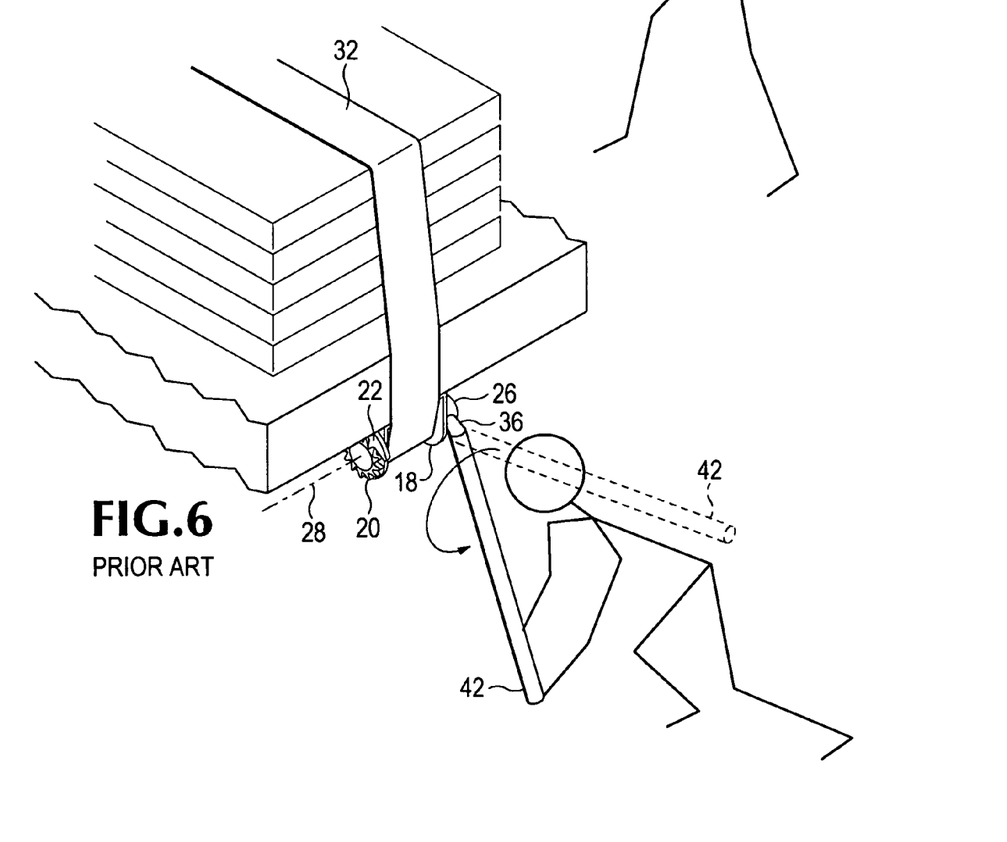
FIG. 6 is a view similar to FIG. 5 showing the positions of the winch bar and of a user of the winch bar after the winch bar has slipped in a socket and moved through a conical rotation.

Depending upon the sizes of the offset angle 90 and compensating angle 98, and depending on the length 86 of the reach portion 80, a lateral offset distance 102 of a particular size is established and available to avoid interference of the winch bar 60 with an obstacle such as a tire, fender, etc., during use. The offset distance 102 thus provided may be in the range of 1-4 inches, and preferably about 2-3 inches, thus being significantly less than the radius of a cone of rotation defined by the handle portion 42 of the winch bar 38 as shown in FIGS. 4-6. Thus while the winch bar 60 shown in FIG. 7 would be able to spin if the winch drive engagement portion 62 slips in a socket 30 of a winch spool drive hub 24, the resulting distance 104, about 6 inches, for example, through which the handle portion 100 of the winch bar 60 can move between an angled-up position of the handle portion 100 as shown in solid line and an angled-down position shown in broken line, has shown through field evaluation to be insignificant and not likely to cause a user to fall or be injured. Also, when used in the angled down position, the winch bar 60 does not result in the handle portion 42 extending down at as steep an angle as might occur with the prior art winch bar 38, and a user does not have to bend over as far to tighten a strap 32.

Because of the lateral offset distance 102, resulting from the offset angle 90, the compensating angle 98, and the length 86 of the reach portion 80, however, the winch bar 60 provides an ample obstacle clearance area or zone 106 alongside the elongate reach portion 80 and the elongate third portion 92. By rotating the winch bar through 180 degrees about the central longitudinal axis 68 of the winch drive engagement portion 62, between the position shown in solid line in FIG. 7 and the opposite position shown in broken line, the obstacle clearance zone 106 may be used to extend the angle through which the winch drive hub 26 may be rotated about the axis 28 by movement of the winch bar 60 with the drive engagement portion 62 engaged in a single socket 30.

Figure 8A:
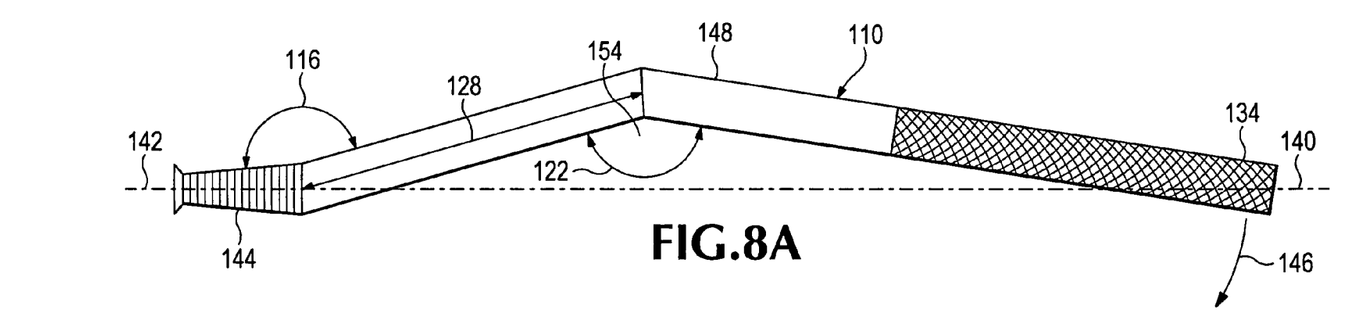
FIG. 8A is a side elevational view of an alternative winch bar according to the present disclosure including a single compensating angle.
Figure 8B:
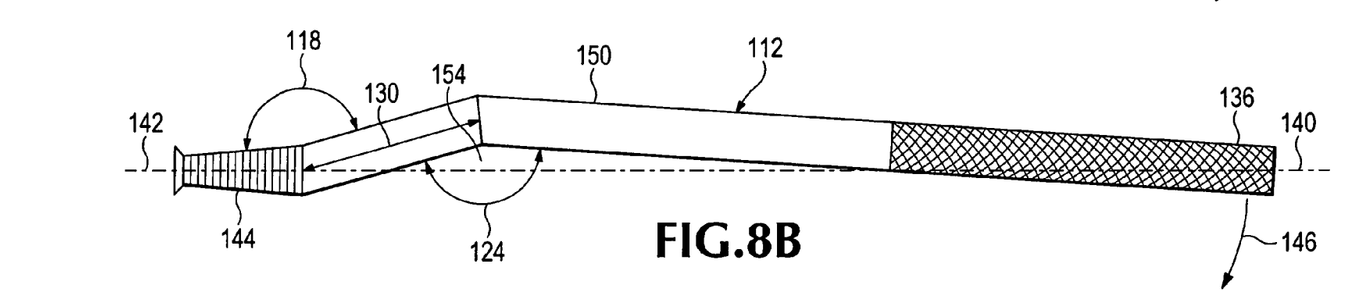
FIGS. 8B and 8C are side elevational views of other alternative winch bars according to the present disclosure, each including a single compensating angle and having dimensions somewhat different from those of the winch bar shown in FIG. 8A.
Figure 8C:
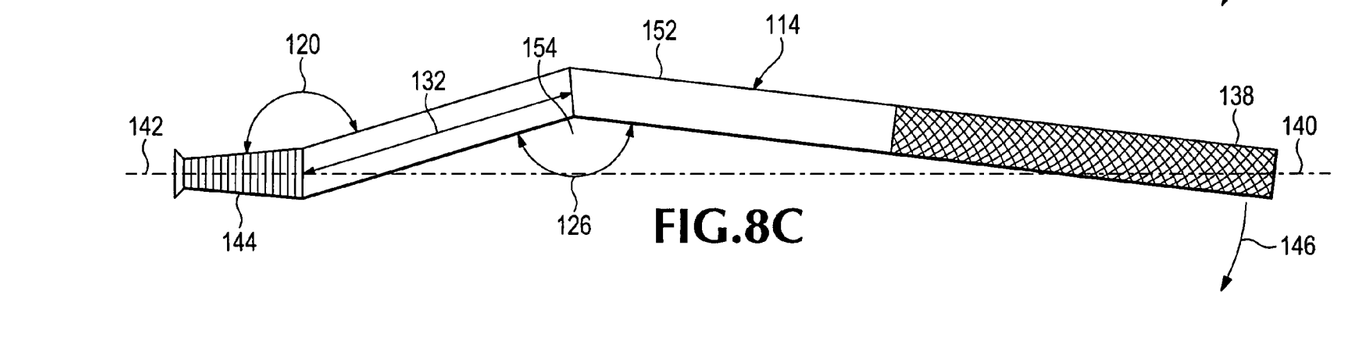

Referring next to FIGS. 8A, 8B, and 8C, each of generally similar winch bars 110, 112, and 114 has a single compensating angle, and the size of each offset angle 116, 118, and 120 may be slightly larger than the respective compensating angle 122, 124, or 126. The compensating angle 122, 124, or 126 is the only compensating angle, so that as shown in FIGS. 8A, 8B, and 8C, it compensates for the respective offset angle 116, 118, or 120. Depending upon the length 128, 130, or 132 of the respective reach portion, each compensating angle 122, 124, or 126 may be chosen to result in the handle portion 134, 136, or 138 being a return portion, that is, being directed obliquely toward and eventually intersecting an extension 140 of the central longitudinal axis 142 of the winch drive engagement portion 144 of the respective one of the winch bars 110, 112, and 114. The outer end of the handle portion 134, 136, or 138, as a result, lies generally in alignment with the central axis 142 of the winch drive engagement portion 144. The compensating angle 122, 124, or 126 thus is an obtuse angle directly related to the length 128, 130, or 132 of the respective reach portion and of the respective elongate third portion 148, 150, or 152.

As a result, when the drive engagement portion 144 of one of the winch bars 110, 112, or 114 is engaged with a socket 30 in a winch drive hub or receiver 26 the winch bar extends generally radially and diametrically with respect to the hub or receiver 26. Discounting a small angular divergence permitted by the taper of the winch drive engagement portion 144, the outer end of the handle portion 134, 136, or 138 is in the same radially extending line. A force applied to the handle portion 134, 136, or 138 in the general direction of the arrow 146 in FIG. 8A, 8B, or 8C, but at an angle, will thus have practically no lever arm about the central axis 142 through which to act to urge the winch drive engagement portion 144 to rotate within the socket 30 to create a conical movement of the handle as is possible with the prior art winch bar 38 as shown in FIGS. 5 and 6.

Figure 9A:
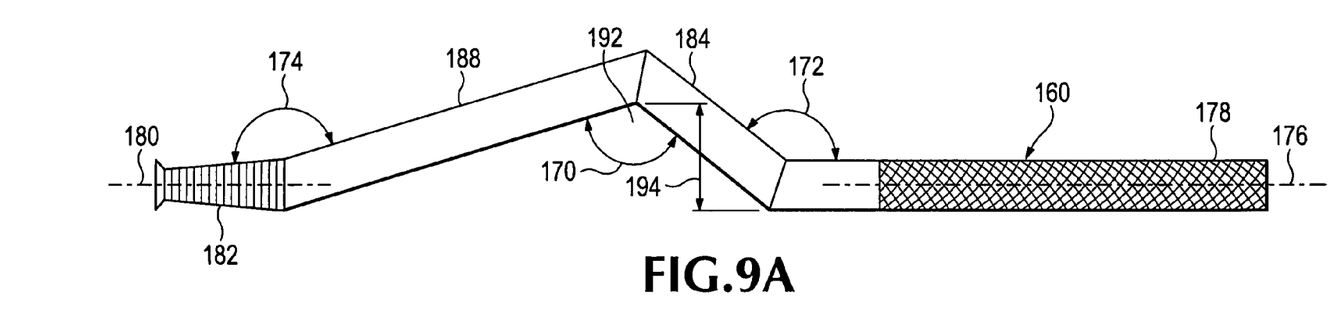
FIG. 9A shows another winch bar including two compensating angles that is an embodiment of a feature of the present invention.
Figure 9B:
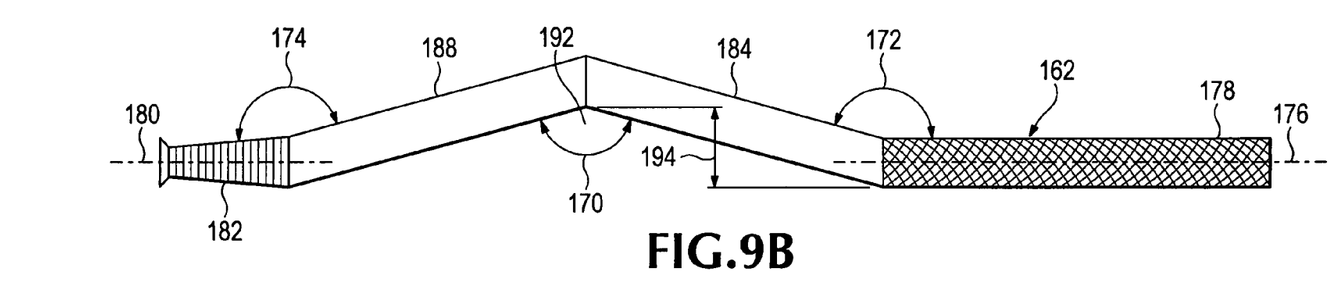
FIG. 9B and FIG. 9C are views similar to FIG. 9A, showing alternative winch bars according to the present disclosure and each including two compensating angles located at positions different from those in the winch bar shown in FIG. 9A.
Figure 9C:
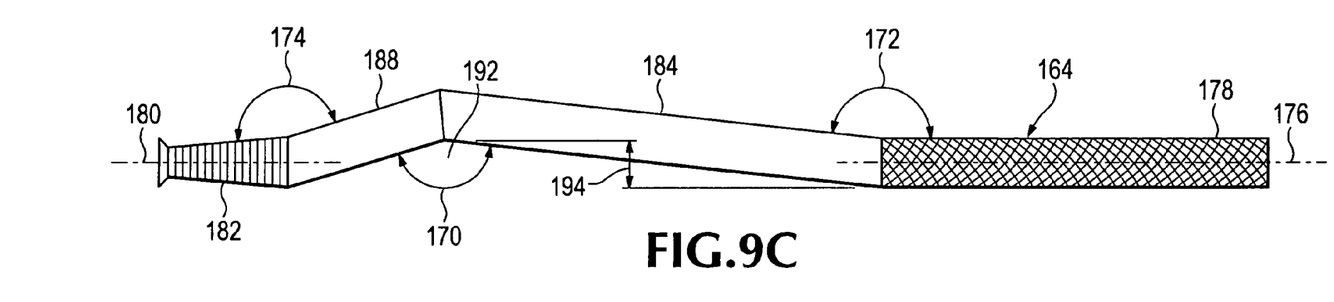

FIGS. 9A, 9B, and 9C show winch bars 160, 162, and 164 which are embodiments each including two compensating angles 170 and 172, where each first compensating angle 170 opposes the direction of the offset angle 174, and the respective second compensating angle 172 opposes the direction of the first compensating angle 170 and is similar in size, to align the longitudinal handle axis 176 of the handle portion 178 with the central longitudinal axis 180 of the winch spool drive engagement portion 182 of each of the winch bars 160, 162, and 164. The first compensating angle 170 may be of various sizes, as desired, and thus might be as small as 80 or 90 degrees or as large as 160 degrees. The second compensating angle 172 thus delineates an outer end of the elongate third portion 184, and an inner end of the handle portion 178. In this arrangement, the winch spool drive engagement portion 182, the reach portion 188, the elongate third portion 184, and the handle portion 178 are preferably all coplanar with each other, so that the offset angle 174, the first compensating angle 170, and the second compensating angle 172 are all in the same plane, as well. As may be seen in FIGS. 9A, 9B, and 9C, by selecting the sizes of the offset angle 174, the first compensating angle 170, and the second compensating angle 172 and choosing the lengths of the reach portion 188 and the elongate third portion 184, an obstacle clearance area 192 may be defined in an appropriate size and having a maximum offset distance 194 from the central longitudinal axis of the winch spool drive engagement portion 182 located at the first compensating angle 170. As a result, the winch bars 160, 162, and 164 may be used with the respective reach portion 188 of each directed as shown in FIGS. 9A, 9B, and 9C, to avoid an obstacle near the winch and near the bottom of a strap-winding swing or stroke of the respective winch bar, and the winch bar may be rotated 180 degrees about the central longitudinal axis 180 of the winch spool drive engagement portion 182 to avoid an obstacle near the winch near the top or beginning of a winding stroke of the winch bar, to permit the drive engagement portion 182 to be inserted into a socket 30 in the spool drive hub or receiver 26 of the winch while the ratchet pawl 22 retains the winch spool 24 in the position achieved by a previous winch bar winding stroke.

Figure 10A:
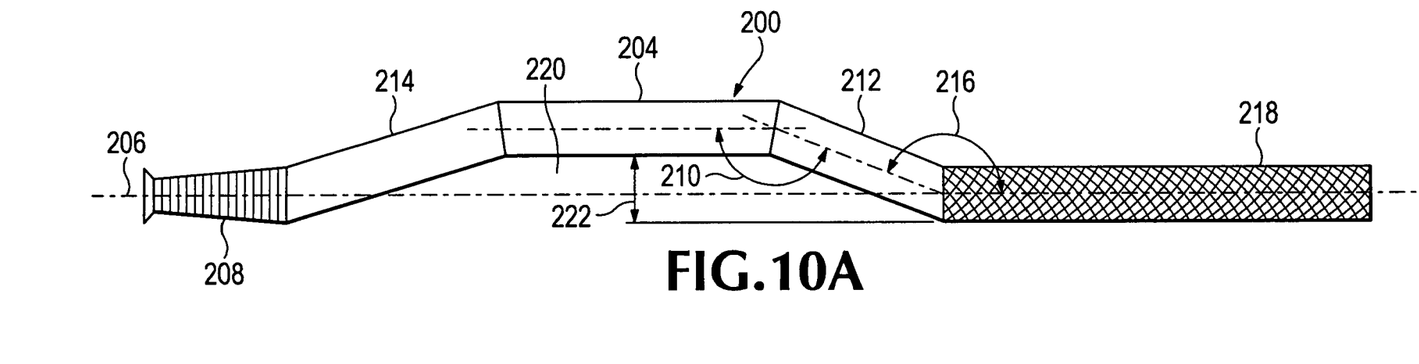
FIGS. 10A and 10B are side elevational views of additional alternative winch bars according to the present disclosure, each including an offset portion of the lever arm, and each of whose handle portions are located in collinear alignment with the central axis of the winch drive engagement portion of each.
Figure 10B:
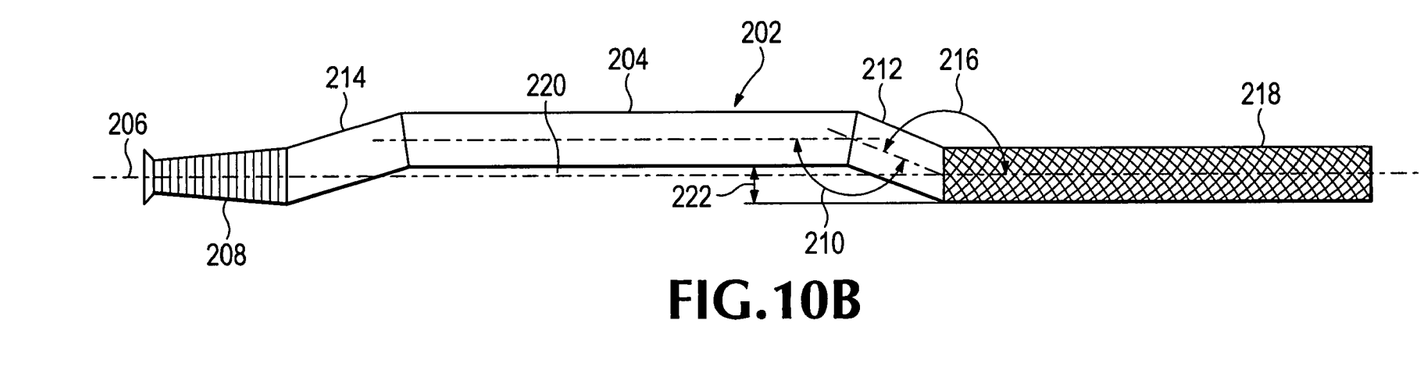

As shown in FIGS. 10A and 10B, in a pair of generally similar winch bars 200 and 202 an elongate third portion 204 may be substantially parallel with or may extend at a small angle with respect to the central longitudinal axis 206 of the winch spool drive engagement portion 208, and a second compensating angle 210 delineates a return portion 212 that is coplanar with the reach portion 214 and the elongate third portion 204 and that is directed obliquely away from the elongate third portion and towards an extension of the central longitudinal axis of the drive engagement portion 208. A third compensating angle 216 at an outer end of the return portion 212 demarcates a handle portion 218 that may be parallel with and collinear with the winch spool drive engagement portion 208. The reach portion 214, elongate third portion 204, and return portion 212 thus provide an obstacle clearance area 220 with a lateral offset dimension 222 provided throughout the length of the elongate third portion 204, between the outer end of the reach portion 214 and the inner end of the return portion 212. At the same time, the handle portion 218 of the winch bar is not susceptible to a conical spin that might injure a user as in use of the prior art winch bar 38, because the handle 218 is collinear with the winch spool drive engagement portion 208.

As may be seen by comparison of the winch bars shown in FIGS. 10A and 10B with each other, the lateral offset dimension 222 and the longitudinal location and dimensions of the obstacle clearance area 220 provided by the winch bar may vary, with different dimensions being more or less desirable depending on factors such as, for example, the types, sizes, and locations of obstacles common to a particular type of flatbed truck or trailer, or to the size and spacing of teeth in the ratchet wheel 20 of the strap winches 18 used on a particular flatbed truck or trailer.

Figures 11, 12, 13, 14A, 14B, 15:
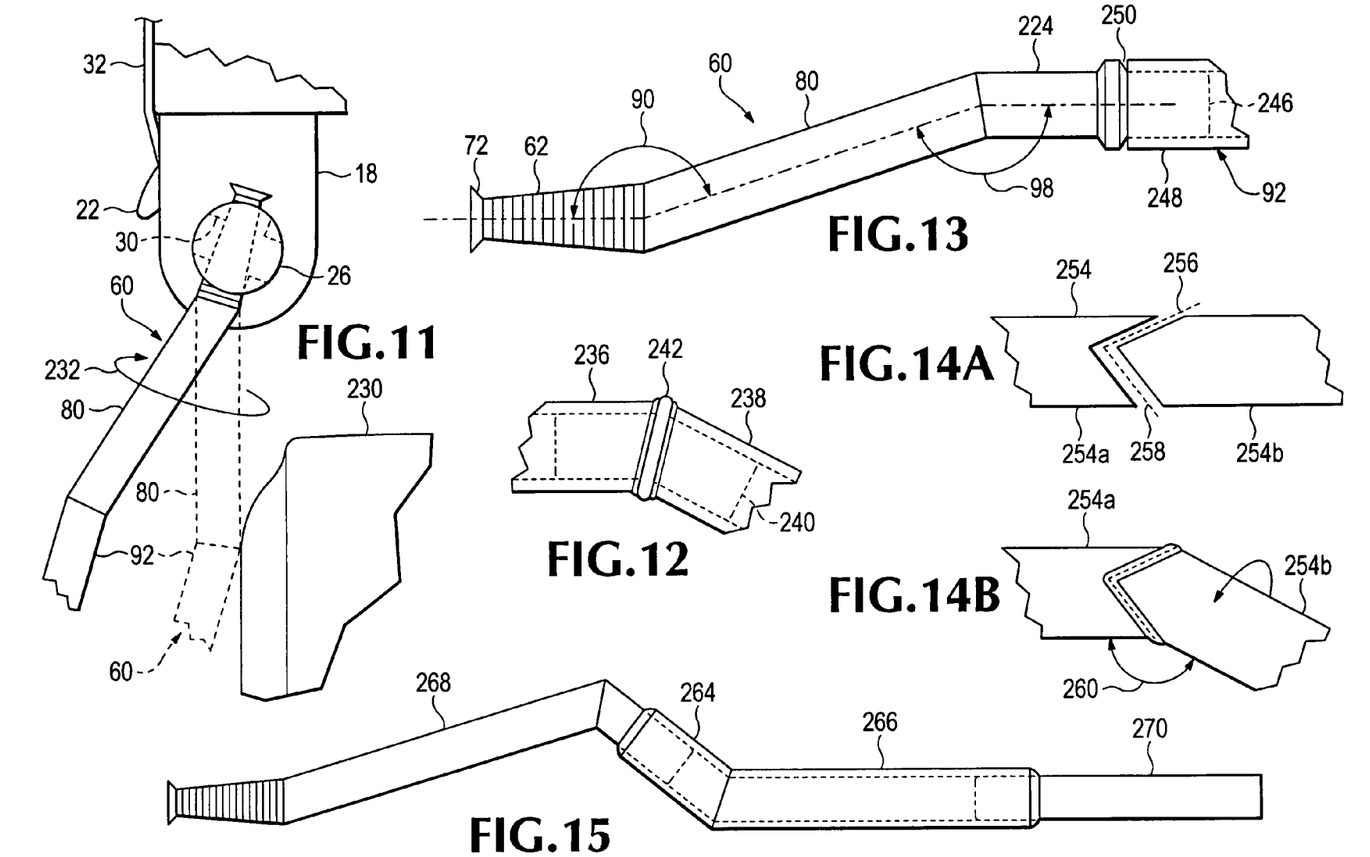
FIG. 11 shows the use of a winch bar such as that shown in FIG. 7 to tighten a strap on a strap winch where an obstacle has to be avoided in turning the winch spool far enough for the winch bar to be inserted in a different socket for a subsequent strap-winding stroke.
FIG. 12 is a fragmentary view showing one possible construction of an angled joint in a winch bar such as the ones shown herein.
FIG. 13 is a side elevational views of a portion of a winch bar similar to the one shown in FIG. 7, showing one type of construction of the bar in the vicinity of a compensating angle.
FIGS. 14A and 14B are fragmentary views of a portion of a winch bar such as that shown in FIG. 7 showing another manner of construction of a compensating angle portion of the winch bar.
FIG. 15 is a view of a winch bar constructed in another manner.

As shown in FIG. 11, when a winch bar such as the winch bar 60 shown in FIG. 7 has encountered an obstacle such as the tire 230 of a truck when a strap-tightening stroke is made beginning with the reach portion 80 angled down with respect to the winch drive engagement portion 62, that is, in the position shown in broken line in FIGS. 7 and 11, the winch bar 60 may then be allowed to move upward until the pawl 22 engages a tooth of the ratchet wheel 20 to hold the strap 32, and the winch bar 60 can be rotated in the socket 30 of the winch spool drive hub 26, as indicated by the arrow 232, to the position shown in solid line in FIG. 11, which will allow the winch spool to be rotated further about its axis of rotation 28 while the same socket 30 is engaged by the drive engagement portion 62. The ratchet pawl 22 may then engage a subsequent tooth of the ratchet wheel 20, thus holding the strap 32 in a tighter condition, so that the winch bar 60 can be removed from the socket 30 and can be inserted into the next socket 30, if it is necessary to continue tightening the strap 26.

The compensating angle or angles may be provided in a winch bar 60, 112, 160, etc., in several different ways. In order to provide a winch bar that is not unduly heavy, it may be desirable to use a hollow pipe construction except for the winch drive engagement portion and some or all of the reach portion. A winch bar lever arm portion of pipe construction could be cut into two parts 236 and 238 at a non-perpendicular angle, after which one portion may be rotated 180 degrees with respect to the other and the two portions 236 and 238 may then be welded together as shown in FIG. 12, to form an angled connection, either with or without an end-supporting insert 240 of the type shown in FIG. 12, in which a radially protruding annular ridge 242 may help support a weld joint.

Alternatively, as shown in FIG. 13, in the winch bar 60 the winch drive engagement portion 62, the reach portion 80, and an initial portion 244 of the elongate third portion 92 including an insert portion 246, may be of solid forged or cast metal, and a further part 248 of the elongate third portion 92, of hollow tubular metal, may be fitted over the insert portion 246 and welded in place at 250.

As shown in FIGS. 14A and 14B, an angle may be provided in a tubular portion 254 of a winch bar by cutting the tubular portion 254 on two intersecting planes 256 and 258 to form two separate portions 254*a* and 254*b,* then rotating one of the portions 180 degrees about its longitudinal axis relative to the other, as indicated by the arrow. The two portions are then welded together again as shown in FIG. 14B, with a desired angle 260 provided as a result of the locations of the planes 256 and 258 along which the cuts were made. This sort of joint provides a longer weld and a potentially stronger joint than the single cut shown in FIG. 12.

As another alternative construction, tubular portions 264 and 266 may be slid over and welded to solid forged or cast portions 268 and 270 and welded in place, as shown in FIG. 15.

Those skilled in the art will recognize that numerous modifications and changes may be made to the disclosed embodiments without departing from the scope of the claimed invention. Other embodiments are possible, their specific designs depending upon the particular application.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A winch bar, comprising:
   (a) a winch drive engagement portion having a root end and a tip and defining a first central longitudinal axis and adapted to engage a winch drive socket with said first central longitudinal axis extending in a radial direction;
   (b) an elongate reach portion having a first end attached to the root end of the winch engagement portion and having an opposite second end, the reach portion extending away from the drive engagement portion at an obtuse angle and defining a reach portion central axis intersecting the first central longitudinal axis and thereby defining an obtuse offset angle; and
   (c) an elongate third portion having a pair of opposite inner and outer ends defining a longitudinal axis thereof, the inner end being interconnected with the second end of the reach portion, the third portion extending away from the second end of the reach portion, and the longitudinal axis of the elongate third portion and the reach central axis defining an obtuse compensating angle, the compensating angle resulting in the central longitudinal axis of the third portion being more nearly parallel with the first central longitudinal axis than is the reach central axis, and wherein said winch bar extends in a radial direction from a winch drive socket when said winch drive engagement portion is engaged therein in a radial direction.

2. The winch bar of claim 1 wherein the offset angle and the compensating angle are both in a single plane.

3. The winch bar of claim 1 wherein the elongate third portion includes a handle and an outer end of the winch bar.

4. The winch bar of claim 1 wherein the first central longitudinal axis, the reach central axis, and the longitudinal axis of the elongate third portion are coplanar.

5. The winch bar of claim 2 wherein the compensating angle is equal and opposite to the offset angle, and the elongate third portion is parallel with the first central longitudinal axis.

6. The winch bar of claim 2 wherein the compensating angle is smaller than the offset angle.

7. The winch bar of claim 4 wherein the elongate third portion extends obliquely towards and intersects an extension of the first central longitudinal axis.

8. The winch bar of claim 1 including an elongate return portion having an inner end and an outer end and defining a return portion longitudinal axis, the inner end of the elongate return portion being interconnected with the outer end of the elongate third portion, and the longitudinal axis of the elongate third portion intersecting the return portion longitudinal axis and thereby defining a second compensating angle.

9. The winch bar of claim 8 wherein an extension of the return portion longitudinal axis intersects an extension of the central longitudinal axis of the winch drive engagement portion at a location nearer to the return portion than to the winch drive engagement portion.

10. The winch bar of claim 9 wherein the return portion includes a winch bar handle portion, and wherein the extension of the first central longitudinal axis intersects the winch bar handle portion.

11. The winch bar of claim 8 wherein the return portion longitudinal axis is parallel with the first central longitudinal axis of the winch drive engagement portion.

12. The winch bar of claim 8 including an elongate handle portion having an inner end interconnected with the outer end of the return portion, the handle portion having a handle axis intersecting the return portion longitudinal axis and thereby defining a third compensating angle.

13. The winch bar of claim 12 wherein the handle axis is parallel with the first central longitudinal axis of the winch drive engagement portion.

14. The winch bar of claim 12 wherein the handle axis is coincident with an extension of the first central longitudinal axis of the winch drive engagement portion.

15. The winch bar of claim 8 wherein the reach portion, the elongate third portion, and the return portion together define an obstacle clearance area.

16. The winch bar of claim 1 wherein the winch drive engagement portion is tapered inward from the root end toward the tip and the tip has a radially outwardly directed catch.

17. The winch bar of claim 1 wherein the reach portion and the elongate third portion together define an obstacle clearance area.

18. A winch bar, comprising:
   (a) a winch drive engagement portion having a root end and a tip and defining a first central longitudinal axis;
   (b) an elongate reach portion having a first end attached to the root end of the winch engagement portion and having an opposite second end, the reach portion defining a reach portion central axis intersecting the first central longitudinal axis and thereby defining an offset angle; and
   (c) an elongate third portion having a pair of opposite inner and outer ends defining a longitudinal axis thereof, the inner end being interconnected with the second end of the reach portion, the longitudinal axis of the elongate third portion and the reach central axis defining a compensating angle, and the compensating angle resulting in the central longitudinal axis of the third portion being more nearly parallel with the first central longitudinal axis than is the reach central axis, wherein the first central longitudinal axis, the reach central axis, and the longitudinal axis of the elongate third portion are coplanar, and wherein the elongate third portion extends obliquely towards and intersects an extension of the first central longitudinal axis.

19. The winch bar of claim 18 wherein the elongate third portion includes a handle and an outer end of the winch bar.

20. A winch bar, comprising:
   (a) a winch drive engagement portion having a root end and a tip and defining a first central longitudinal axis;
   (b) an elongate reach portion having a first end attached to the root end of the winch engagement portion and having an opposite second end, the reach portion defining a reach portion central axis intersecting the first central longitudinal axis and thereby defining an offset angle;

(c) an elongate third portion having a pair of opposite inner and outer ends defining a longitudinal axis thereof, the inner end being interconnected with the second end of the reach portion, the longitudinal axis of the elongate third portion and the reach central axis defining a compensating angle, and the compensating angle resulting in the central longitudinal axis of the third portion being more nearly parallel with the first central longitudinal axis than is the reach central axis;

(d) an elongate return portion having an inner end and an outer end and defining a return portion longitudinal axis, the inner end of the elongate return portion being interconnected with the outer end of the elongate third portion, and the longitudinal axis of the elongate third portion intersecting the return portion longitudinal axis and thereby defining a second compensating angle; and (e) an elongate handle portion having an inner end interconnected with the outer end of the return portion, the handle portion having a handle axis intersecting the return portion longitudinal axis and thereby defining a third compensating angle.

21. The winch bar of claim 20 wherein the handle axis is parallel with the first central longitudinal axis of the winch drive engagement portion.

22. The winch bar of claim 20 wherein the handle axis is coincident with an extension of the first central longitudinal axis of the winch drive engagement portion.

23. The winch bar of claim 20 wherein the offset angle and the compensating angle are both in a single plane.

24. The winch bar of claim 20 wherein the first central longitudinal axis, the reach central axis, and the longitudinal axis of the elongate third portion are coplanar.

25. The winch bar of claim 20 wherein the compensating angle is equal and opposite to the offset angle, and the elongate third portion is parallel with the first central longitudinal axis.

26. The winch bar of claim 20 wherein the return portion longitudinal axis is parallel with the first central longitudinal axis of the winch drive engagement portion.

27. A winch bar, comprising:

(a) a winch drive engagement portion having a root end and a tip and defining a first central longitudinal axis and adapted to engage a winch drive socket with said first central longitudinal axis extending in a radial direction;

(b) an elongate reach portion having a first end attached to the root end of the winch engagement portion and having an opposite second end, the reach portion extending away from the drive engagement portion at an obtuse angle and defining a reach portion central axis intersecting the first central longitudinal axis and thereby defining an obtuse offset angle; and (c) an elongate third portion having a pair of opposite inner and outer ends defining a longitudinal axis thereof, the inner end being interconnected with the second end of the reach portion, the third portion extending away from the second end of the reach portion, the longitudinal axis of the elongate third portion and the reach central axis defining an obtuse compensating angle, and the compensating angle and the inner end of the third portion being separated laterally from the first central longitudinal axis by a lateral offset distance, providing an obstacle clearance zone alongside the reach portion, and wherein said winch bar extends in a radial direction from a winch drive socket when said winch drive engagement portion is engaged therein in a radial direction.

28. The winch bar of claim 27 wherein said lateral offset distance is in the range of 1 to 4 inches.

* * * * *